(12) United States Patent
Okada (10) Patent No.: US 7,488,944 B2
(45) Date of Patent: Feb. 10, 2009

(54) RADIATION IMAGE DETECTOR

(75) Inventor: Yoshihiro Okada, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/871,276

(22) Filed: Oct. 12, 2007

(65) Prior Publication Data

US 2008/0173823 A1 Jul. 24, 2008

(30) Foreign Application Priority Data

Oct. 12, 2006 (JP) ............................. 2006-278411

(51) Int. Cl.
G01T 1/24 (2006.01)
(52) U.S. Cl. ..................... 250/370.08; 250/370.09; 250/370.02; 250/395; 250/208.1; 250/370.11; 250/370.1; 250/370.14; 250/336.1; 250/370.01
(58) Field of Classification Search ............ 250/370.09, 250/370.02, 370.08, 395, 208.1, 370.11, 250/370.1, 370.14, 336.1, 370.01
See application file for complete search history.

(56) References Cited

U.S. PATENT DOCUMENTS

| 4,996,413 | A | * | 2/1991 | McDaniel et al. | ........ 250/208.1 |
|---|---|---|---|---|---|
| 5,962,856 | A | * | 10/1999 | Zhao et al. | ............. 250/370.09 |
| 6,404,852 | B1 | * | 6/2002 | Petrick et al. | ............... 378/98.8 |
| 6,718,010 | B2 | * | 4/2004 | Petrick et al. | ............... 378/98.8 |
| 7,119,341 | B2 | * | 10/2006 | Petrick | ................... 250/370.09 |
| 7,132,667 | B2 | * | 11/2006 | Petrick et al. | .......... 250/370.09 |
| 2006/0192130 | A1 | * | 8/2006 | Yagi | ...................... 250/370.14 |

FOREIGN PATENT DOCUMENTS

JP 2002-369078 A 12/2002

* cited by examiner

*Primary Examiner*—David P Porta
*Assistant Examiner*—Djura Malevic
(74) *Attorney, Agent, or Firm*—Sughrue Mion, PLLC

(57) ABSTRACT

A radiation image detector including a charge generation layer, and a detection layer including: many pixels, each having a collection electrode for collecting charges generated in the charge generation layer, a storage capacitor for storing charges collected by the collection electrode, and a TFT switch for reading out charges from the storage capacitor; many scanning lines; and many data lines. Each storage capacitor is formed between a storage capacitor electrode connected to the drain electrode of a TFT switch and the scanning line connected to a TFT switch adjacent to the TFT switch to which the drain electrode belongs, an array of the TFT switches is divided into upper and lower halves, each data line is divided into upper and lower halves, and a dummy wire is provided at the division boundary for forming a storage capacitor of a pixel disposed at the division boundary section.

8 Claims, 12 Drawing Sheets

RADIATION IMAGE DETECTOR

BACKGROUND OF THE INVENTION

1. Field of the Invention

The present invention relates to a radiation image detector which includes the following layers stacked on top of another: a charge generation layer that generates charges by receiving radiation; and a detection layer in which multitudes of pixels, each having a TFT switch, are disposed two dimensionally.

2. Description of the Related Art

Recently, flat panel detectors (FPDs) have been put into practical use. FPD includes an X-ray sensitive layer on a TFT active matrix array and is capable of directly converting X-ray information to digital data. It has advantages over conventional imaging plates in that it allows instantaneous image verification and checking for motion images, and is spreading rapidly.

First, the configuration of a conventional radiation image detector will be described with reference to FIG. 10.

Figure 10:
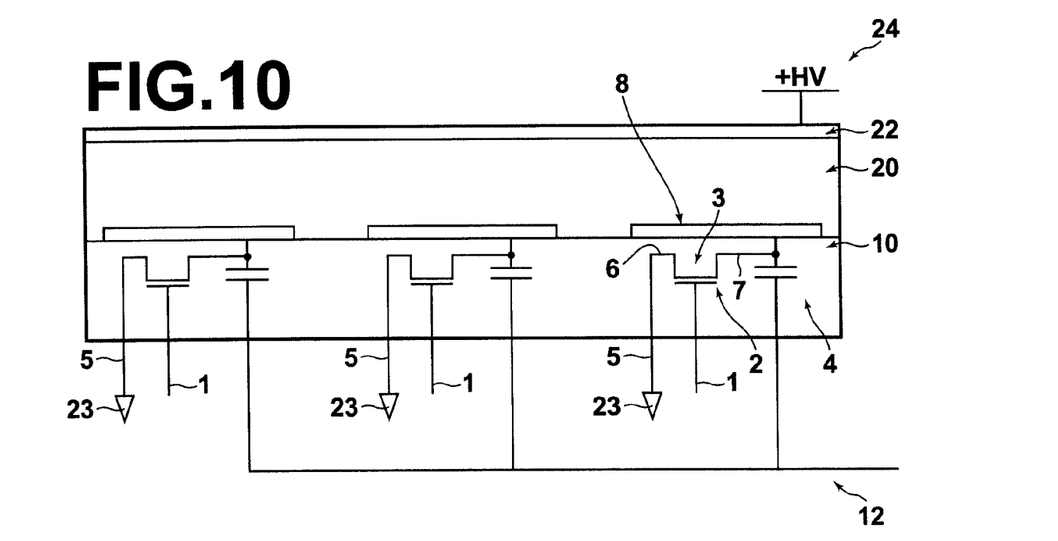
FIG. 10 is a schematic configuration diagram of a conventional radiation image detector.

In the conventional radiation image detector, a semiconductor layer 20 which is conductive for electromagnetic waves is formed on an active matrix substrate 10 having collection electrodes 8 disposed in an array, and an upper electrode 22 is formed on the semiconductor layer 20, as illustrated in FIG. 10. The upper electrode 22 is connected to a high voltage power source 24. The semiconductor film 20 is a selenium-based amorphous a-Se film with a thickness of 100 to 1000 μm, and generates charges inside of the film when exposed to X-rays. A TFT switch 3 and a storage capacitor 4 are provided adjacent to each of collection electrodes 8 disposed on the active matrix substrate 10 in an array. The drain electrode 7 of the TFT switch 3 is connected to one of the electrodes of the storage capacitor 4. The other electrode of the storage capacitor 4 is connected to a storage capacitor wire 12. A scanning line 1 is connected to the gate electrode 2 of the TFT switch 3, and a data line 5 is connected to the source electrode 6. An amplifier 23 is connected to the end of the data line 5.

The operational principle of the conventional radiation image detector will be described next.

When X-rays are irradiated from above in FIG. 10, the semiconductor film 20 generates charges inside thereof. Holes of the charges generated in the semiconductor film 20 are collected to each collection electrode 8 due to a bias between the upper electrode 22 and collection electrode 8, and stored in the storage capacitor 4 electrically connected to the collection electrode 8. The semiconductor film 20 generates different amounts of charges depending on the X-ray dosage, so that an amount of charges depending on image information represented by the X-rays is stored in the storage capacitor 4 of each pixel. Thereafter, a signal for switching ON each TFT switch 3 is sequentially applied through each scanning line 1, and charges stored in each storage capacitor 4 are read out through each data line 5. Then, the amount of charges of each pixel is detected by each amplifier 23, thereby the image information is read out.

Here, in the currently available radiation image detectors, the common pixel size is around 100 to 300 μm square. In order to improve image quality of X-ray images, a finer pixel resolution is demanded.

The pixel size, however, is practically limited to around 100 μm square due to restrictions arising from the TFT array structure. The reason for this will be described with reference to a layout chart of the conventional radiation image detector shown in FIG. 11. In the conventional TFT layout structure, a storage capacitor wire 12 is disposed between the scanning lines 1 along them in order to form the storage capacitor 4. The storage capacitor wire is formed of the same layer metal as the scanning line 1 in order to reduce production costs.

Figure 11:
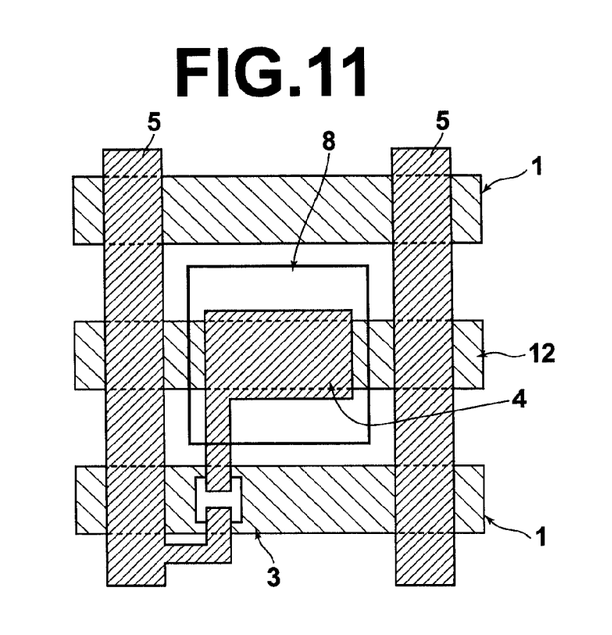
FIG. 11 illustrates a pixel layout of the conventional radiation image detector.

Here, for example, assuming to realize a radiation image detector with a pixel pitch of 50 μm using the aforementioned pixel layout. If the width of the scanning line 1 and storage capacitor wire 12 is 12 μm, then the distance available between the scanning line 1 and storage capacitor wire 12 is only 13 μm. As described above, the scanning line 1 and storage capacitor wire 12 are on the same layer, so that the decrease in the distance between them leads to decrease in the yield rate due to increase in the interline leaks. Formation of the scanning lines and storage capacitor wires in different layers additionally requires a wiring layer and an insulation layer. This is not practical because of a significant increase in the production cost.

Figure 3:
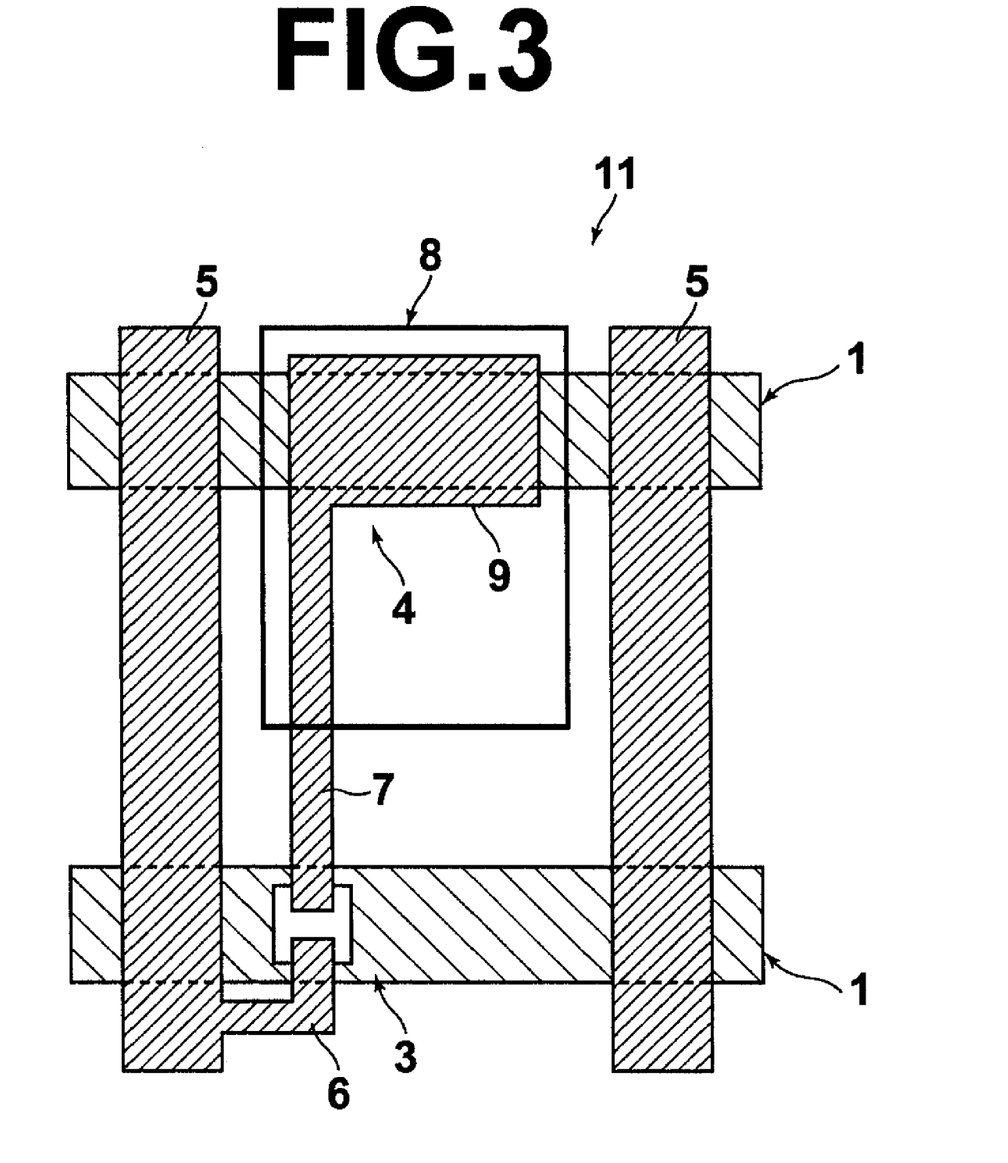
FIG. 3 illustrates a pixel layout of the radiation image detector according to the first embodiment.

Here, a pixel layout without requiring the storage capacitor wiring is conceivable in which each of the storage capacitors 4 is formed by overlapping a storage capacitor electrode 9 connected to the drain 7 of each of the TFT switches 3 with a scanning line 1 connected to a TFT switch adjacent to each of the TFT switches 3 through an insulation film as illustrated in FIG. 3. The aforementioned pixel layout allows the spacing of the scanning lines to be increased. For example, when the pixel pitch is 50 μm and the width of the scanning line is 12 μm, a distance of 38 μm is ensured between the scanning lines, thereby the interline leakage may be prevented.

In the mean time, the number of pixels of such TFT array type radiation image detector has increased along with higher resolution and larger size. As a result, the electrical noise has also increased. Consequently, a vertical division method is adopted in a large radiation image detector, in which data lines are divided into upper and lower halves at a center portion of the TFT switch array, and amplifier ICs are connected to the TFT switch array at the upper and lower sides.

Figure 12:
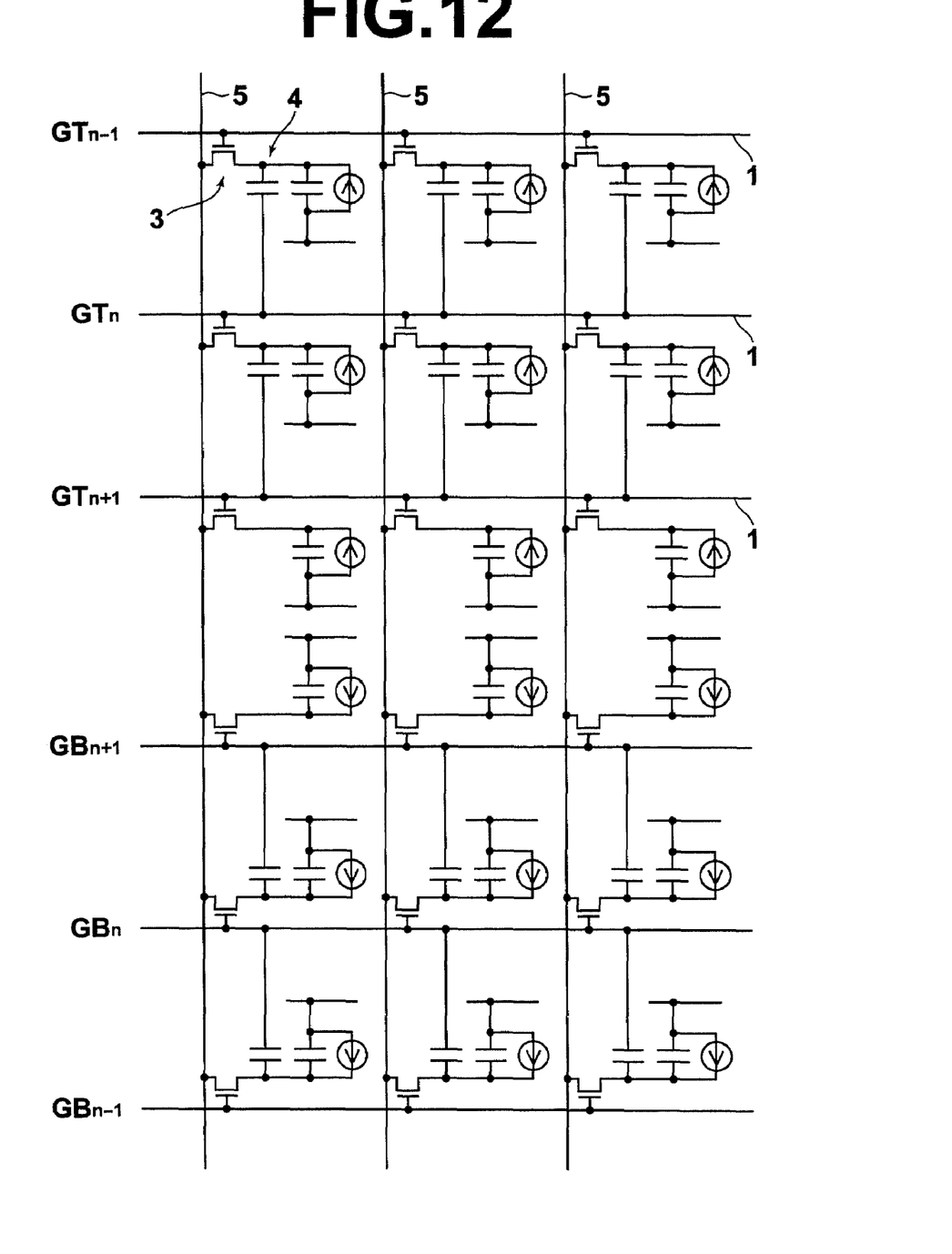
FIG. 12 is an equivalent circuit diagram of the conventional radiation image detector.
Figure 13:
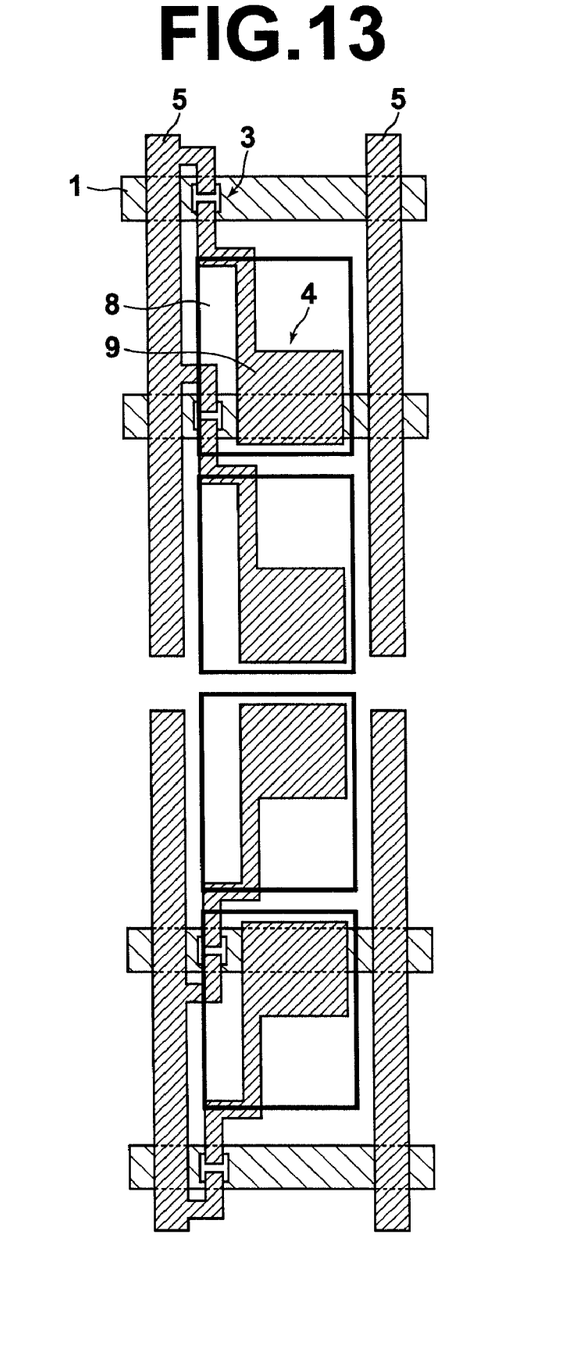
FIG. 13 illustrates a layout of the conventional radiation image detector.

If the vertical division method is adopted in the pixel layout illustrated in FIG. 3, however, the storage capacitors 4 for the pixels at the division boundary section are unable to be formed as clear from the equivalent circuit shown in FIG. 12 or other drawings and the layout shown in FIG. 13.

In view of the circumstances described above, it is an object of the present invention to provide a vertical division radiation image detector like that as described above which is capable of forming storage capacitors for the pixels at the division boundary section and making a step difference in the image at the division boundary section less noticeable.

SUMMARY OF THE INVENTION

The radiation image detector of the present invention is a radiation image detector including the following layers stacked on top of another:

a charge generation layer that generates charges by receiving radiation; and a detection layer including: multitudes of pixels, each having a collection electrode for collecting charges generated in the charge generation layer, a storage capacitor for storing charges collected by the collection electrode, and a TFT switch for reading out charges stored in the storage capacitor; multitudes of scanning lines for switching ON/OFF the TFT switches; and multitudes of data lines through which charges stored in the storage capacitors are read out, wherein:

each of the storage capacitors is formed between a storage capacitor electrode connected to the drain electrode of a TFT switch and the scanning line connected to a TFT switch adjacent to the TFT switch to which the drain electrode belongs;

an array of the TFT switches is divided into upper and lower halves for driving;

each of the data lines is divided into upper and lower halves; and a dummy wire is provided at the division boundary section of the upper and lower halves of the array of the TFT switches for forming a storage capacitor of a pixel disposed at the division boundary section.

The radiation image detector of the present invention may include a TFT switch drive section for performing detection on the array of the TFT switches from upper and lower ends of the array.

Further, a dummy wire may be provided for each row of pixels located on each of the upper and lower sides of the division boundary section.

Still further, the dummy wires, each provided for each row of pixels located on each of the upper and lower sides of the division boundary section, may be electrically connected with each other.

Further, the dummy wires, each provided for each row of pixels located on each of the upper and lower sides of the division boundary section, may be disposed at such a distance that the collection electrodes are disposed at equally spaced apart in the up/down directions.

Still further, the collection electrode of each pixel of each pixel row located on each of the upper and lower sides of the division boundary section may be disposed such that the distance between the collection electrode of the pixel of the pixel row on the upper side of the division boundary section and the collection electrode of the corresponding pixel of the pixel row on the lower side of the division boundary becomes close to the distance between the collection electrodes of the pixels other than the pixels of the pixel rows in the up/down directions.

The radiation image detector of the present invention includes the following layers stacked on top of another: a charge generation layer that generates charges by receiving radiation; and a detection layer including: multitudes of pixels, each having a collection electrode for collecting charges generated in the charge generation layer, a storage capacitor for storing charges collected by the collection electrode, and a TFT switch for reading out charges stored in the storage capacitor; multitudes of scanning lines for switching ON/OFF the TFT switches; and multitudes of data lines through which charges stored in the storage capacitors are read out. Here, each of the storage capacitors is formed between a storage capacitor electrode connected to the drain electrode of a TFT switch and the scanning line connected to a TFT switch adjacent to the TFT switch to which the drain electrode belongs, an array of the TFT switches is divided into upper and lower halves for driving, each of the data lines is divided into upper and lower halves, and a dummy wire is provided at the division boundary section of the upper and lower halves of the array of the TFT switches for forming a storage capacitor of a pixel disposed at the division boundary section. This arrangement allows the storage capacitors to be provided for the pixels at the division boundary section, thereby a step difference in the image at the division boundary section may be made less noticeable.

Further, if the radiation image detector of the present invention include a TFT switch drive section for performing detection on the array of the TFT switches from upper and lower ends of the array, variations in the potential of the charges stored in the storage capacitors may be prevented, and noise in detected image data may be reduced.

Still further if the dummy wire is provided for each row of pixels located on each of the upper and lower sides of the division boundary section, the storage capacitors of the pixels at the division boundary section may have the same capacitance as that of the storage capacitors of the other pixels.

Further, if the dummy wires, each provided for each row of pixels located on each of the upper and lower sides of the division boundary section, are disposed at such a distance that the collection electrodes are disposed at equally spaced apart in the up/down directions, the spacing of the collection electrodes becomes uniform, thereby a step difference in the image at the division boundary section may be made less noticeable.

Still further, if the collection electrode of each pixel of each pixel row located on each of the upper and lower sides of the division boundary section is disposed such that the distance between the collection electrode of the pixel of the pixel row on the upper side of the division boundary section and the collection electrode of the corresponding pixel of the pixel row on the lower side of the division boundary becomes close to the distance between the collection electrodes of the pixels other than the pixels of the pixel rows in the up/down directions, the spacing of the collection electrodes becomes close to uniform, thereby a step difference in the image at the division boundary section may be made less noticeable.

DESCRIPTION OF THE PREFERRED EMBODIMENTS

Hereinafter, a first embodiment of the radiation image detector of the present invention will be described with reference to the accompanying drawings.

A flat panel image sensor, as the radiation image detector of the present embodiment, is an image sensor capable of detecting an image represented by X-rays or the like, and is used, for example, in X-ray imaging equipment that creates a picture of an X-ray image transmitted through a human body or the like.

It is noted that the radiation image detector of the present invention is not necessarily limited to the flat panel type, and includes an image sensor with a curved surface substrate.

Figure 2:
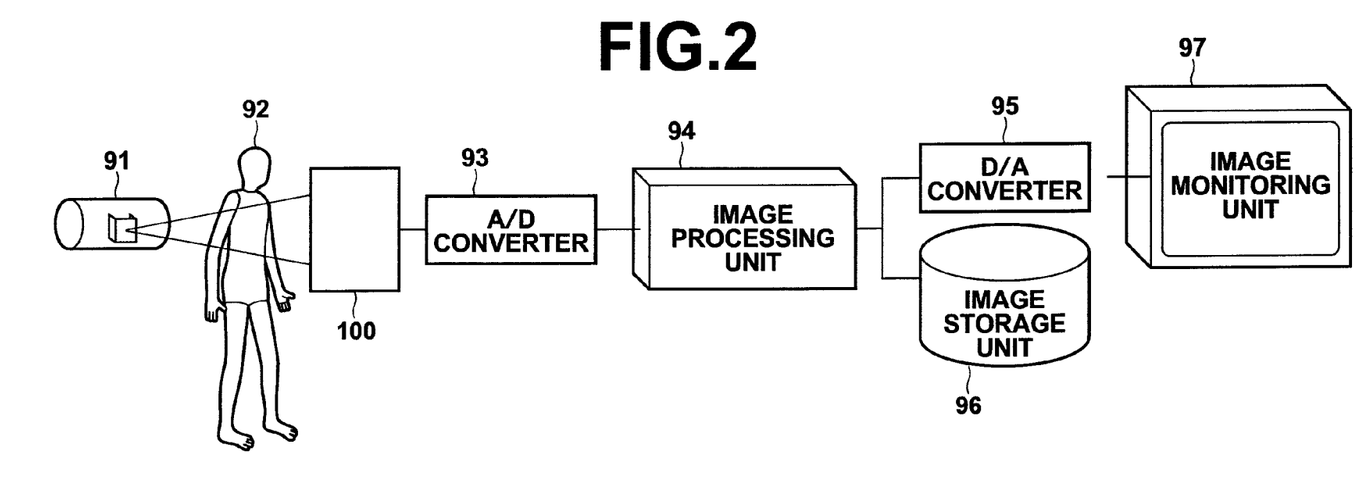
FIG. 2 illustrates an example application of the radiation image detector of the present invention.

That is, for example, an X-ray transmission image of a subject 92 formed by X-rays outputted from an X-ray tube 91 is converted to image signals by a radiation image detector 100 of the present embodiment, in which photoelectric conversion elements are disposed in a two dimensional array, as illustrated in FIG. 2.

Analog image signals outputted from the radiation image detector 100 are converted to digital image signals through an A/D converter 93, and inputted to an image processing unit 94. The image processing unit 94 causes an image storage unit 96 to store an image to be preserved, as well as performing various types of image processing. Digital image signals outputted from the image processing unit 94 are converted to analog image signals through a D/A converter 95 and may be displayed on the screen of an image monitoring unit 97.

Figure 1:
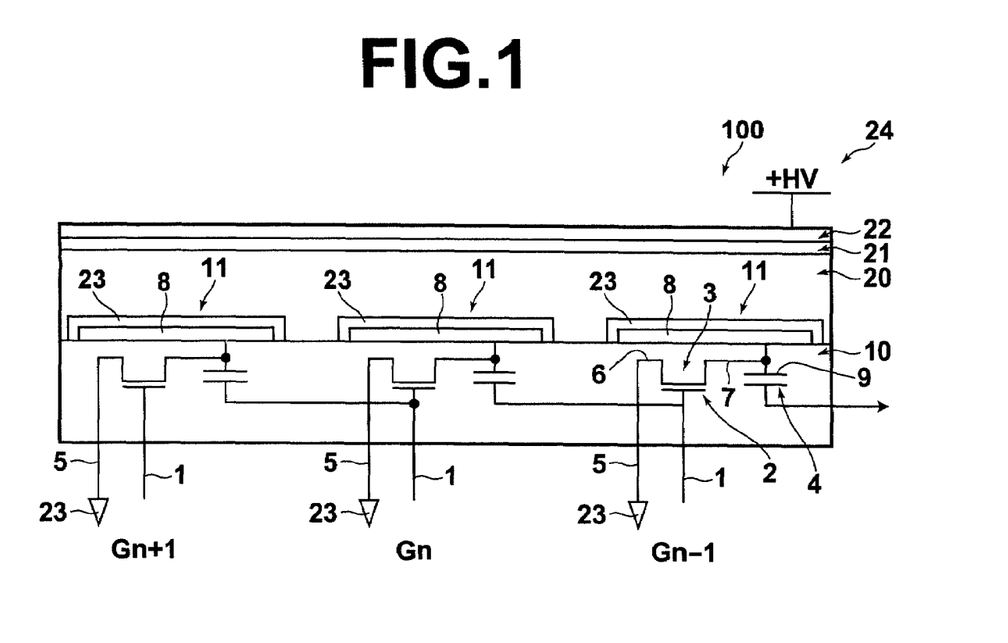
FIG. 1 is a schematic configuration diagram of the radiation image detector according to a first embodiment of the present invention.

FIG. 1 illustrates a schematic configuration of the radiation image detector 100 according to the first embodiment.

The radiation image detector 100 according to the present embodiment includes an active matrix substrate 10, a semiconductor film 20 formed on substantially the entire surface of the active matrix substrate 10, a dielectric layer 21, an upper electrode 22, and an electron blocking layer 23 provided on a collection electrode 8 to be describe later, as illustrated in FIG. 1.

The semiconductor film 20 has conductivity for electromagnetic waves, and generates charges inside of the film when exposed to X-rays. As for the semiconductor film 20, for example, a selenium-based amorphous a-Se film with a thickness of 100 to 1000 µm may be used. The semiconductor film 20 is formed with a thickness of, for example, 300 to 1000 µm by a vacuum deposition method.

The dielectric layer 21 and electron blocking layer 23 are for preventing charges from being stored in a storage capacitor 4, to be described later, caused by leak currents when X-rays are irradiated, and provided as required.

That is, the dielectric layer 21 prevents charges from entering into the semiconductor film 20 from the upper electrode 22 when an operation voltage is applied to the upper electrode 22, while the electron blocking layer 23 prevents charges from entering into the semiconductor film 20 from the collection electrode 8. This may improve the resolution of an X-ray image by preventing leak currents.

The upper electrode 22 is formed of a low resistance conductive material, such as Au, Al or the like, and connected to a high voltage power source 24.

The active matrix substrate 10 includes: multitudes of pixels 11, each having a collection electrode 8 for collecting charges generated in the semiconductor film 20, a storage capacitor 4 for storing charges collected by the collection electrode 8, and a TFT switch 3 for reading out charges stored in the storage capacitor 2; multitudes of scanning lines 1 for switching ON/OFF the TFT switches 3; and multitudes of data lines 5 through which charges stored in the storage capacitors 4 are read out. The pixels 11 are disposed in an array.

As for the TFT switch 3, an a-Si TFT using amorphous silicon in the active layer is generally used. A scanning line 1 for switching ON/OFF the TFT switch 3 is connected to the gate electrode 2 of the TFT switch 3, and a data line 5, through which charges stored in the storage capacitor 4 are read out, is connected to the source electrode 6. A storage capacitor electrode 9, which is one of the electrodes forming the storage capacitor 4 is connected to the drain electrode 7. The other electrode of the storage capacitor 4 is connected to the scanning line 1 connected to the TFT switch 3 of a pixel 11 adjacent to the pixel 11 to which the storage capacitor 4 belongs.

An amplifier 23 is connected to the end of the data line 5.

A layout of the pixel 11 of the radiation image detector according to the present embodiment is shown in FIG. 3.

As illustrated in FIG. 3, a scanning line 1 and a data line 5 which is orthogonal to the scanning line 1 are disposed around each pixel 11. A TFT switch 3 is disposed adjacent to the intersection between the scanning line 1 and data line 5. The source electrode of the TFT switch 3 is connected to the data line 5, and the drain electrode 7 is connected to the storage capacitor electrode 9. The storage capacitor electrode 9 is connected to a collection electrode 8 through a contact hole. The storage capacitor electrode 9 is disposed so as to overlap with the scanning line 1 through an insulation film. A storage capacitor 4 is formed by the storage capacitor electrode 9 and the scanning line 1. That is, the scanning line 1 functions not only as a scanning line but also as a storage capacitor electrode.

Figure 4:
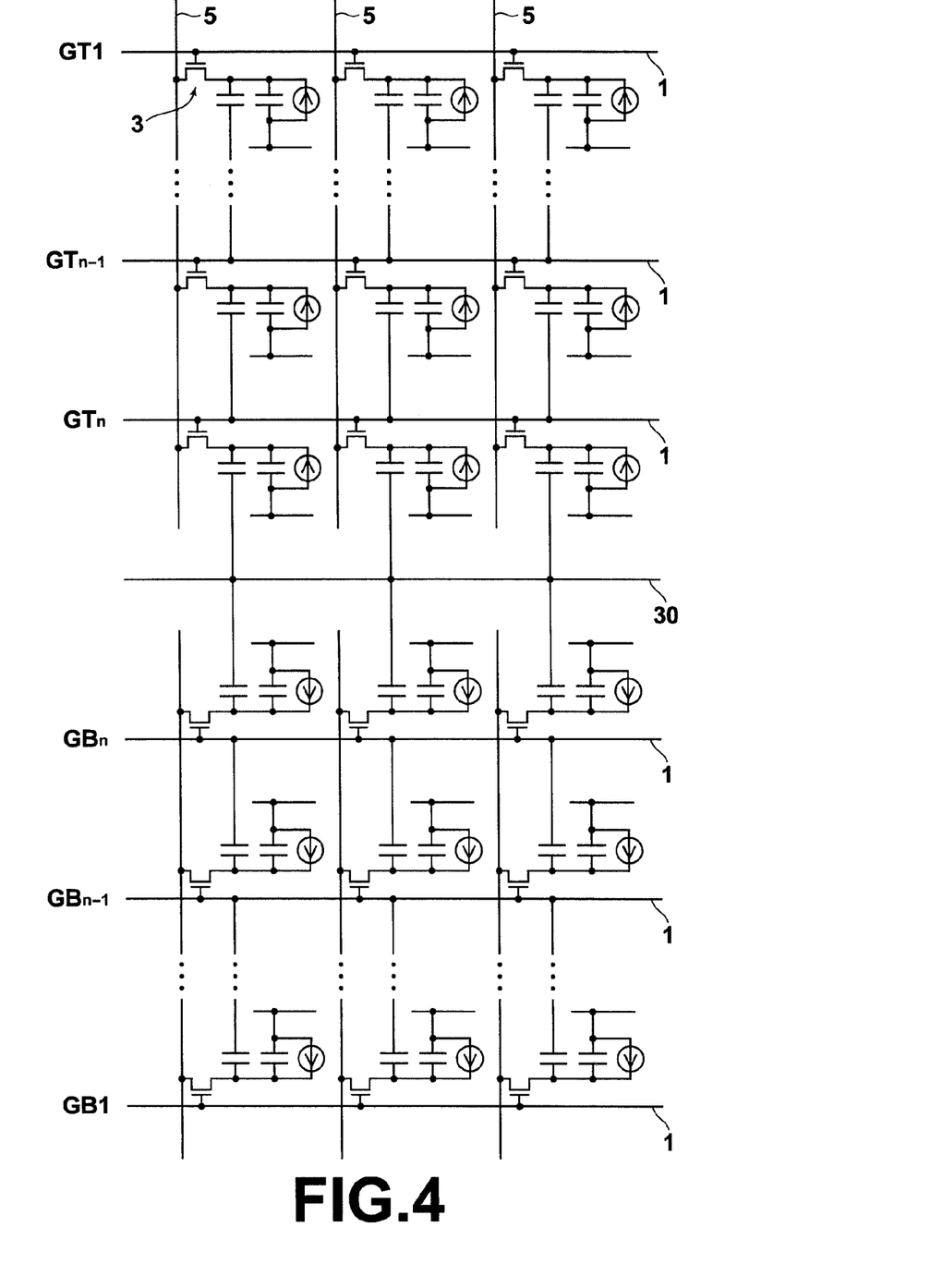
FIG. 4 is an equivalent circuit diagram of the radiation image detector according to the first embodiment of the present invention.
Figure 5:
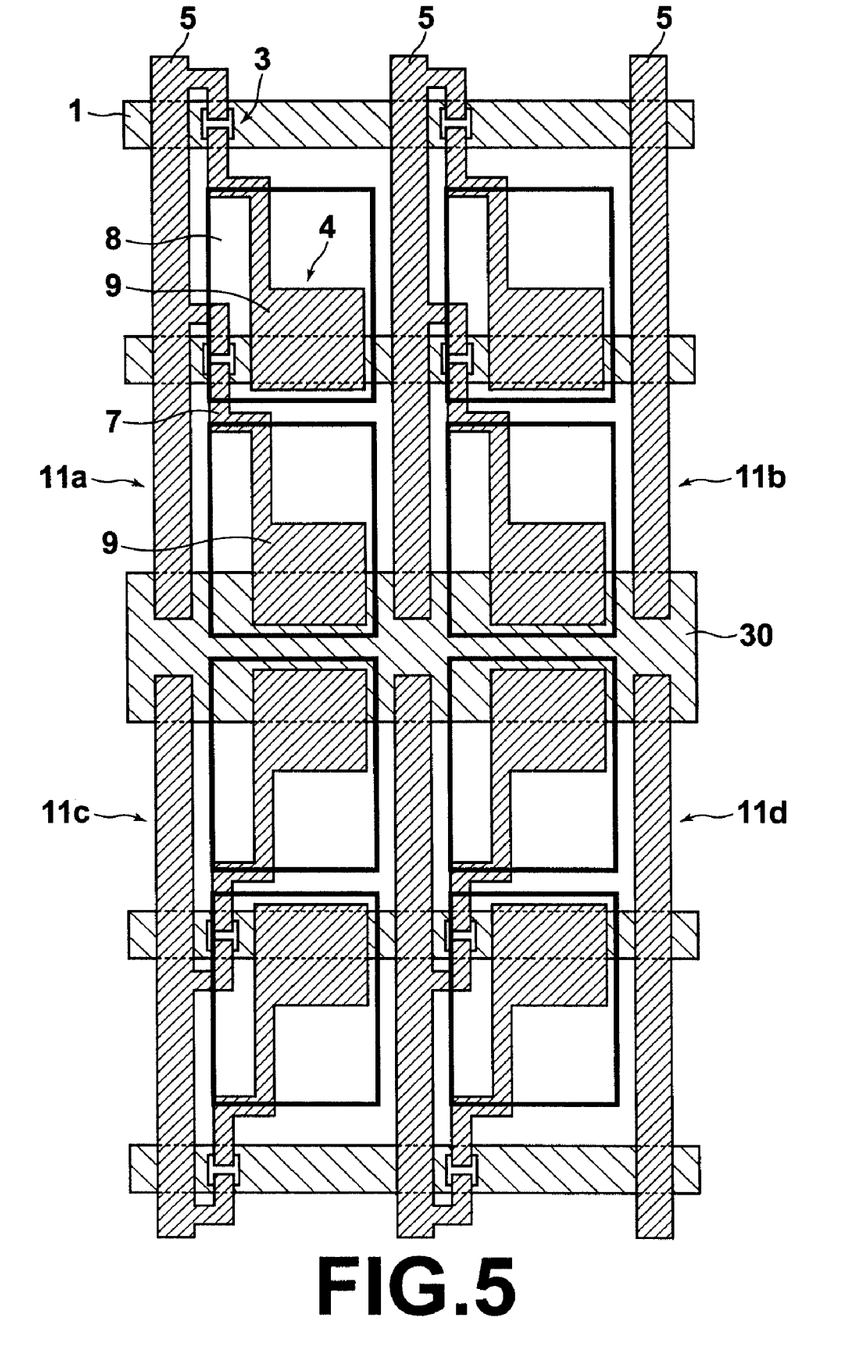
FIG. 5 illustrates a layout of the radiation image detector according to the first embodiment of the present invention.

An equivalent circuit diagram and a layout of the radiation image detector according to the present embodiment are illustrated in FIGS. 4 and 5 respectively.

As illustrated in FIG. 4, a plurality of scanning lines are disposed in the horizontal direction and a plurality of data lines are disposed in the vertical direction of FIG. 4. In the radiation image detector according to the present embodiment, the TFT switches 3 are divided into upper and lower halves for driving, and the data lines 5 are divided between upper and lower sides of the TFT switch array and not shown amplifiers 23 are provided on each side. On the upper side of the TFT switch array, the scanning lines 1 are disposed evenly spaced intervals of pixel pitch from the upper end, and on the lower side of the TFT switch array, they are disposed evenly spaced intervals of pixel pitch from the bottom end. This means that the scanning line 1 does not exist at the division boundary section of the TFT switch array. Consequently, in the radiation image detector according to the present embodiment, a dummy wire 30 made of the same material as that of the scanning line 1 is disposed to form storage capacitors 4 of the pixels 11 at the division boundary section of the TFT switch array.

As illustrated in FIG. 5, the dummy wire 30 forms storage capacitors 4 by intersecting with storage capacitor electrodes 9 connected to the drain electrodes 7 of the TFT switches 3 of the pixels 11a, 11b, 11c, and 11d at the division boundary section of the TFT switch array. This allows storage capacitors 4 to be provided for the pixels at the division boundary section of the TFT switch array and the division boundary section to be less noticeable.

Next, the operational principle of the radiation image detector according to the present embodiment will be described.

When X-rays are irradiated from above in FIG. 1, the semiconductor film 20 generates charges inside thereof. Holes of the charges generated in the semiconductor film 20 are collected to each collection electrode 8 due to a bias between the upper electrode 22 and collection electrode 8, and stored in the storage capacitor 4 electrically connected to the collection electrode 8. The semiconductor film 20 generates different amounts of charges depending on the X-ray dosage, so that an amount of charges depending on image information represented by the X-rays is stored in the storage capacitor 4 of each pixel.

Thereafter, a signal for switching ON each TFT 3 is sequentially applied through each scanning line 1, and charges stored in each storage capacitor 4 are read out through each data line 5. Then, the amount of charges of each pixel 11 is detected by each amplifier 23, thereby the image information is read out.

A method for driving the radiation image detector according to the present embodiment will be described with reference to the equivalent circuit diagram of FIG. 4.

First, X-ray image data are recorded in the radiation image detector by irradiating X-rays as described above. Charges generated in the semiconductor film 20 according to the X-ray dosage are collected by each collection electrode 8 and stored in the storage capacitor 4 electrically connected to the collection electrode 8. Then, an ON signal is sequentially inputted to the scanning lines 1 in the order of GT1, - - - GTn−1, GTn. That is, in the TFT switch array on the upper side shown in FIG. 4, the scanning lines 1 are scanned from top to downward. In response to this, charges stored in the storage capacitor 4 of each pixel 11 are outputted to each data line 5 and detected by the not shown amplifier. Then, the ON signal is sequentially inputted to the scanning lines 1 in the order of GB1, - - - GBn−1, GBn. That is, in the TFT switch array, the scanning lines 1 are scanned from bottom to upward.

It is noted that the radiation image detector according to the present embodiment includes a not shown TFT switch drive section for driving the scanning lines 1 in the manner as described above.

In the radiation image detector according to the present invention, the scanning direction of the scanning lines is particularly important. If the scanning direction is opposite to the direction described above, the potential of the scanning line 1 coupled through the storage capacitor 4 is changed before data is detected, and the potential of the charges stored in the storage capacitor 4 is varied. Therefore, it is preferable that the scanning be performed in the order described above in order to reduce noise in the detected image data.

Next, the radiation image detector according to a second embodiment of the present invention will be described. The radiation image detector according to the present embodiment is identical in general configuration to the radiation image detector according to the first embodiment, but differs in the method of providing the dummy wire. An equivalent circuit diagram and a layout of the radiation image detector according to the present embodiment are illustrated in FIGS. 6 and 7 respectively.

Figure 6:
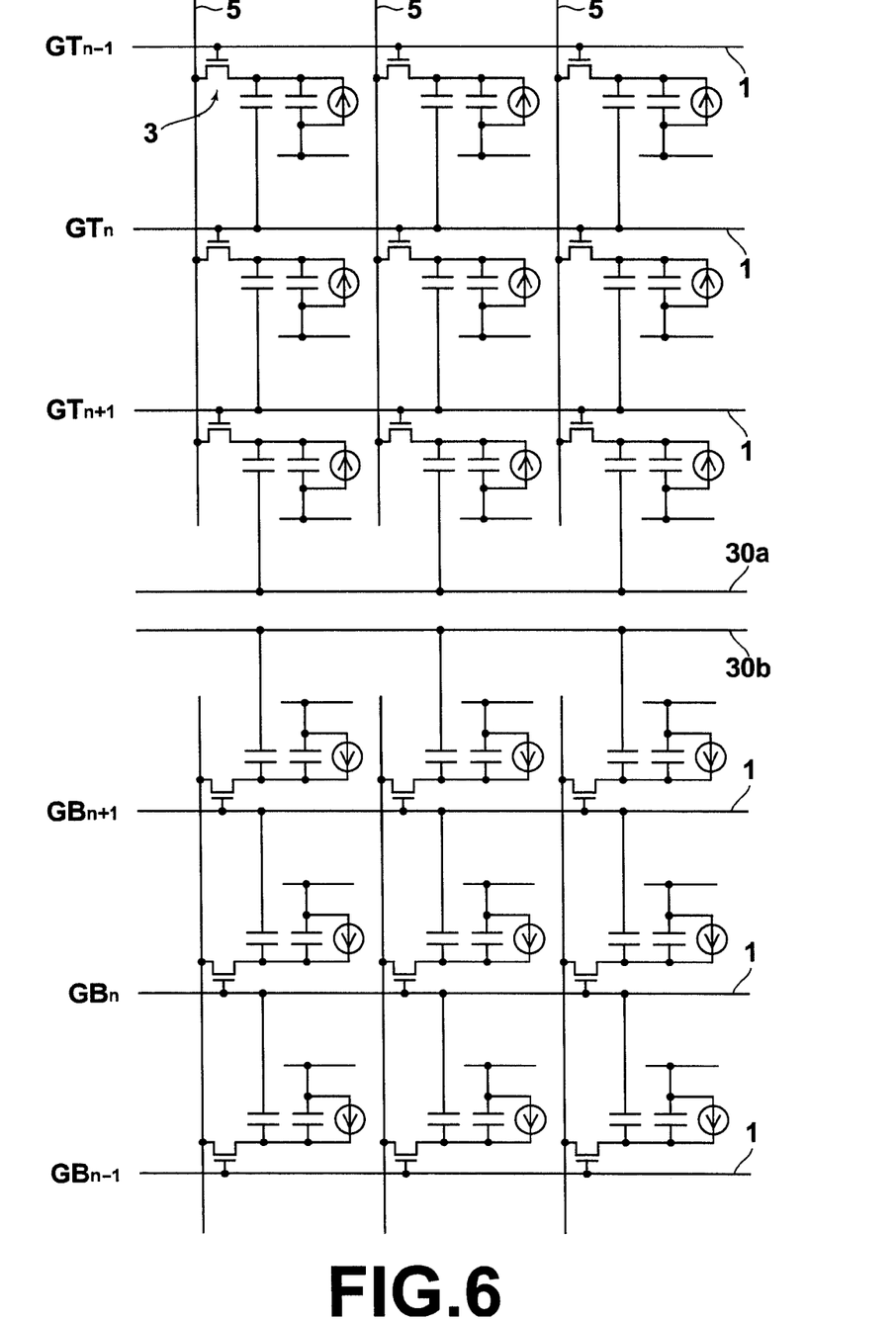
FIG. 6 is an equivalent circuit diagram of the radiation image detector according to a second embodiment of the present invention.
Figure 7:
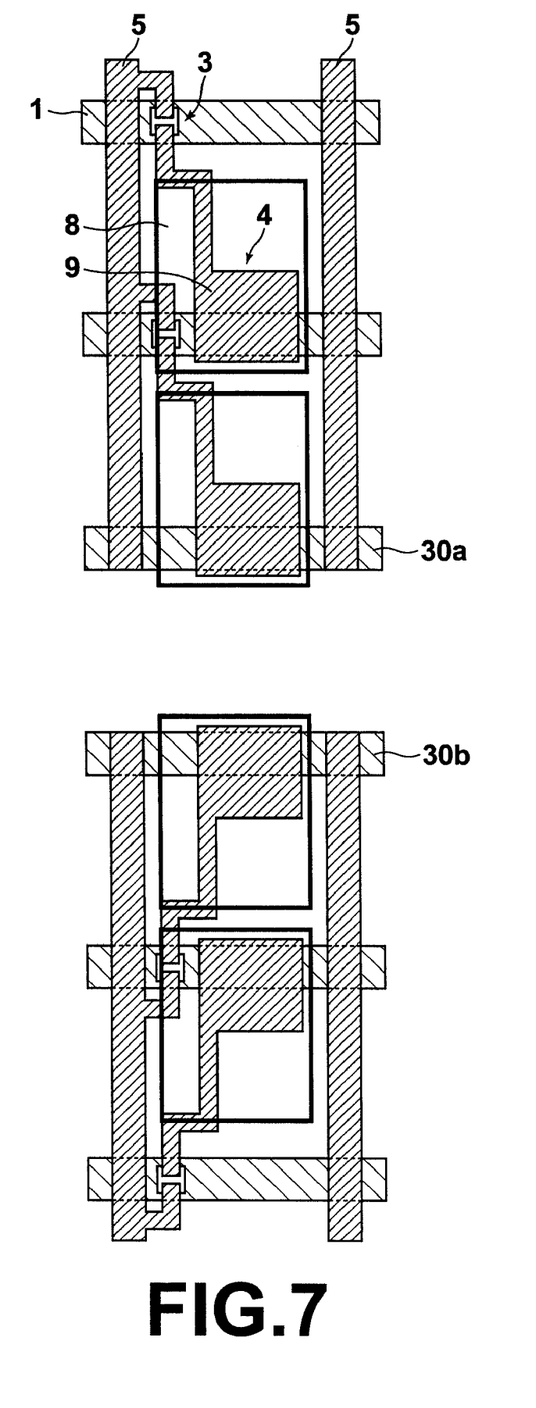
FIG. 7 illustrates a layout of the radiation image detector according to the second embodiment of the present invention.

As illustrated in FIGS. 6 and 7, in the radiation image detector according to the present embodiment, dummy wires 30a and 30b are provided respectively for each pixel row located on each of the upper and lower sides of the division boundary section. The dummy wires 30a, 30b may be electrically separated or connected with each other. For example, the dummy wires 30a, 30b may have the same potential by connecting them together and supplying a common voltage. Alternatively, where a scanning line drive signal is inputted from scanning line drivers, the dummy wires 30a, 30b may be separated and the scanning line drive signal may be inputted thereto from different scanning line drivers with each other so that storage capacitors of the pixels at the division boundary section have a capacitance exactly the same as that of the storage capacitors of the other pixels. In this case, the dummy wires 30a, 30b may be connected to the scanning line driver IC or to the TCP having thereon the scanning line driver IC.

By providing the dummy wires 30a, 30b for the upper and lower sides of the TFT switch array respectively, the storage capacitors 4 of the pixels 11 at the division boundary section may have a capacitance which is identical to that of the storage capacitors 4 of the other pixels 11. This makes a step difference in the image arising from the division less noticeable in comparison with the radiation image detector according to the first embodiment.

Figure 8:
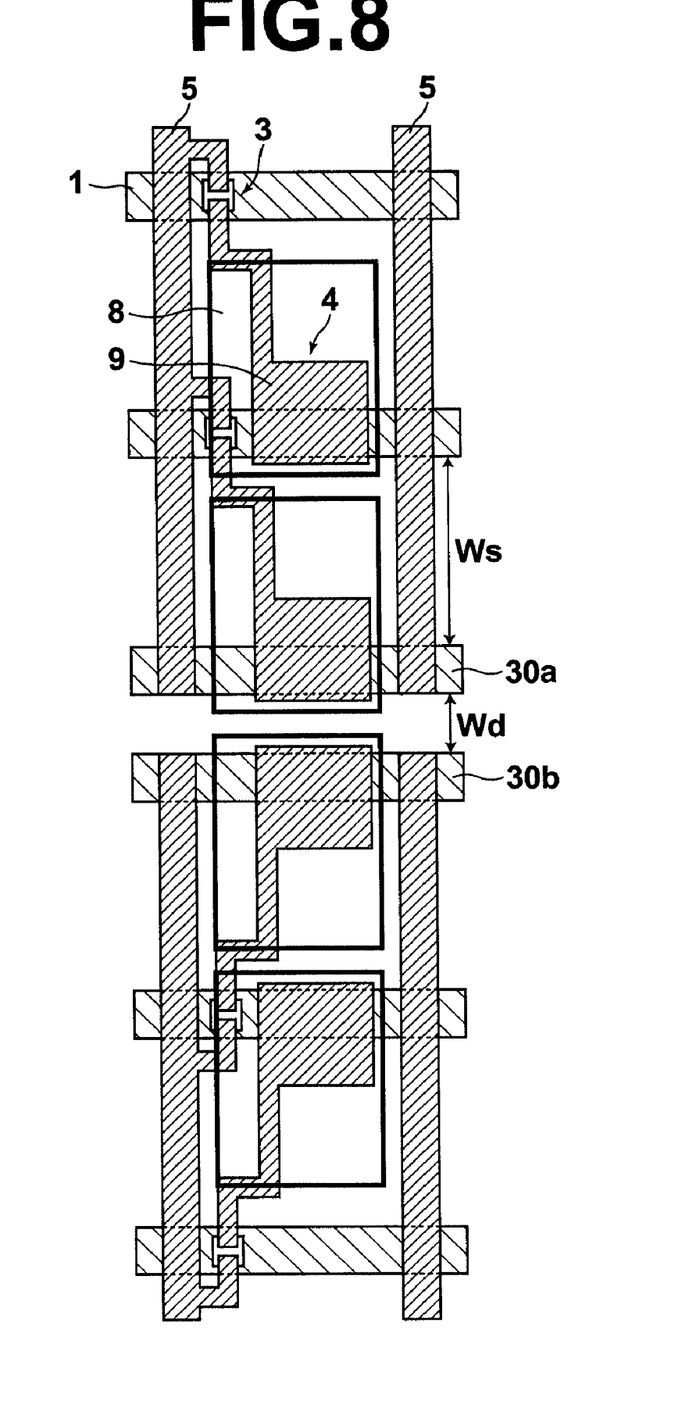
FIG. 8 illustrates a layout of the radiation image detector according to a third embodiment.

Next, the radiation image detector according to a third embodiment of the present invention will be described. The radiation image detector according to the present embodiment is identical in general configuration to the radiation image detector according to the second embodiment, but differs in the method of disposing the dummy wire. A layout of the radiation image detector according to the third embodiment is illustrated in FIG. 8.

In the radiation image detector according to the third embodiment, the dummy wires 30a, 30b are disposed such that the distance Wd between them is smaller than the distance Ws between the scanning lines. That is, they are disposed at such a distance that the collection electrodes 8 are disposed at equally spaced apart in the up/down directions.

By disposing the dummy wires 30a, 30b in the manner as described above, a visual step difference in the image due to space misalignment of the collection electrodes 8 may be reduced.

Figure 9:
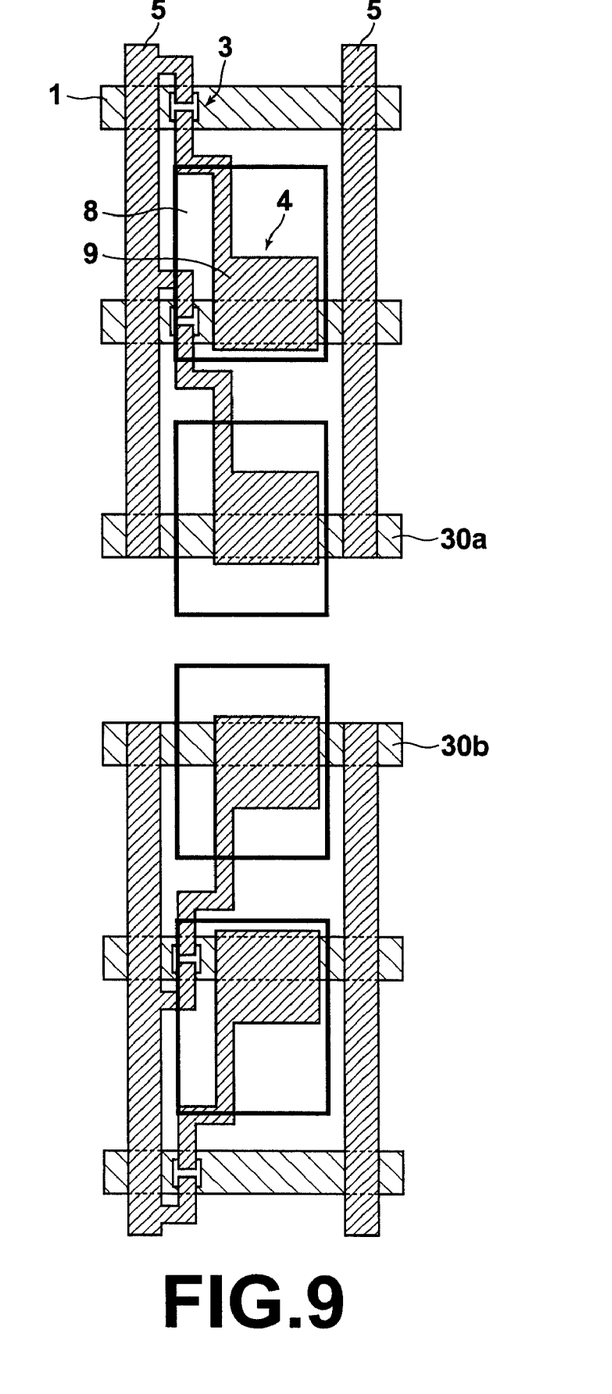
FIG. 9 illustrates a layout of the radiation image detector according to a fourth embodiment.

Next, the radiation image detector according to a fourth embodiment of the present invention will be described. The radiation image detector according to the present embodiment is identical in general configuration to the radiation image detector according to the second embodiment, but differs in the method of disposing the collection electrodes 8 of the pixels 11 at the division boundary section. A layout of the radiation image detector according to the fourth embodiment is illustrated in FIG. 9.

If the dummy wires 30a, 30b are disposed such that the distance Wd between them is smaller than the distance Ws between the scanning lines as in the radiation image detector according to the third embodiment, a leakage fault is likely to occur between the dummy wires 30a, 30b. Consequently, in the radiation image detector according to the fourth embodiment, a step difference in the image arising from the division is made less noticeable by displacing the collection electrodes 8 of the pixels at the division boundary section in the up/down directions without reducing the distance between the dummy wires 30a, 30b. That is, the collection electrode 8 of each pixel 11 of the pixel rows on the upper and lower sides of the division boundary section is disposed such that the distance between the collection electrode 8 of the pixel 11 of the pixel row on the upper side of the division boundary section and the collection electrode 8 of the corresponding pixel 11 of the pixel row on the lower side of the division boundary becomes close to the distance between the collection electrodes 8 of the pixels 11 other than the pixels of the pixel rows in the up/down directions.

Further, a plurality of collection electrodes arranged in the up/down directions adjacent to the pixels 11 of the division boundary section may be displaced such that the amount of displacement becomes greater for the collection electrode closer to the division boundary section, whereby a step difference in the image arising from the division is made less noticeable.

What is claimed is:

1. A radiation image detector comprising the following layers stacked on top of another:
  a charge generation layer that generates charges by receiving radiation; and
  a detection layer including: multitudes of pixels, each having a collection electrode for collecting charges generated in the charge generation layer, a storage capacitor for storing charges collected by the collection electrode, and a TFT switch for reading out charges stored in the storage capacitor; multitudes of scanning lines for switching ON/OFF the TFT switches; and multitudes of data lines through which charges stored in the storage capacitors are read out, wherein:

each of the storage capacitors is formed between a storage capacitor electrode connected to the drain electrode of a TFT switch and the scanning line connected to a TFT switch adjacent to the TFT switch to which the drain electrode belongs;

an array of the TFT switches is divided into upper and lower halves for driving;

each of the data lines is divided into upper and lower halves; and a dummy wire is provided at the division boundary section of the upper and lower halves of the array of the TFT switches for forming a storage capacitor of a pixel disposed at the division boundary section.

2. The radiation image detector of claim 1, wherein the detector comprises a TFT switch drive section for performing detection on the array of the TFT switches from upper and lower ends of the array.

3. The radiation image detector of claim 1, wherein the dummy wire is provided for each row of pixels located on each of the upper and lower sides of the division boundary section.

4. The radiation image detector of claim 2, wherein the dummy wire is provided for each row of pixels located on each of the upper and lower sides of the division boundary section.

5. The radiation image detector of claim 3, wherein the dummy wires, each provided for each row of pixels located on each of the upper and lower sides of the division boundary section, are electrically connected with each other.

6. The radiation image detector of claim 4, wherein the dummy wires, each provided for each row of pixels located on each of the upper and lower sides of the division boundary section, are electrically connected with each other.

7. The radiation image detector of claim 1, wherein the dummy wires, each provided for each row of pixels located on each of the upper and lower sides of the division boundary section, are disposed at such a distance that the collection electrodes are disposed equally spaced apart in the up/down directions.

8. The radiation image detector of claim 1, wherein the collection electrode of each pixel of each pixel row located on each of the upper and lower sides of the division boundary section is disposed such that the distance between the collection electrode of the pixel of the pixel row on the upper side of the division boundary section and the collection electrode of the corresponding pixel of the pixel row on the lower side of the division boundary becomes close to the distance between the collection electrodes of the pixels other than the pixels of the pixel rows in the up/down directions.

* * * * *